(12) United States Patent
Parker et al.

(10) Patent No.: US 11,669,467 B2
(45) Date of Patent: Jun. 6, 2023

(54) MEMORY ACCESS INSTRUCTIONS

(71) Applicant: ARM LIMITED, Cambridge (GB)

(72) Inventors: Jason Parker, Sheffield (GB); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 459 days.

(21) Appl. No.: 15/768,909

(22) PCT Filed: Sep. 6, 2016

(86) PCT No.: PCT/GB2016/052736
§ 371 (c)(1),
(2) Date: Apr. 17, 2018

(87) PCT Pub. No.: WO2017/068317
PCT Pub. Date: Apr. 27, 2017

(65) Prior Publication Data
US 2018/0307627 A1 Oct. 25, 2018

(30) Foreign Application Priority Data
Oct. 20, 2015 (GB) ..................................... 1518541

(51) Int. Cl.
*G06F 12/14* (2006.01)
*G06F 9/30* (2018.01)
(Continued)

(52) U.S. Cl.
CPC ...... *G06F 12/1441* (2013.01); *G06F 9/30043* (2013.01); *G06F 9/30145* (2013.01);
(Continued)

(58) Field of Classification Search
CPC ............ G06F 12/1441; G06F 9/30043; G06F 9/30145; G06F 9/544; G06F 12/14;
(Continued)

(56) References Cited

U.S. PATENT DOCUMENTS

| 6,895,508 B1 | 5/2005 | Swanberg et al. |
| 2009/0172713 A1* | 7/2009 | Kim ..................... G06F 9/30145 719/331 |

(Continued)

FOREIGN PATENT DOCUMENTS

| CN | 1711524 | 12/2005 |
| CN | 101281506 | 10/2008 |

(Continued)

OTHER PUBLICATIONS

International Search Report and Written Opinion of ISA for PCT/GB2016/052736 dated Nov. 25, 2016, 10 pages.
(Continued)

*Primary Examiner* — Masud K Khan
(74) *Attorney, Agent, or Firm* — Nixon & Vanderhye P.C.

(57) ABSTRACT

Processing circuitry performs processing operations specified by program instructions, and a decoder decodes memory access instructions to generate control signals to control the processing circuitry to perform memory access operations. The memory access instructions have respective encodings specifying protected memory access instructions corresponding to protected memory access operations and less-protected memory access instructions corresponding to less-protected memory access operations. The less-protected memory access operations are associated with less restrictive memory access conditions than the protected memory access operations.

18 Claims, 6 Drawing Sheets

(51) Int. Cl.
  *G06F 21/60* (2013.01)
  *G06F 21/79* (2013.01)
  *G06F 12/08* (2016.01)
  *G06F 9/54* (2006.01)
  *G06F 12/084* (2016.01)

(52) U.S. Cl.
  CPC ............ *G06F 9/544* (2013.01); *G06F 12/084* (2013.01); *G06F 12/14* (2013.01); *G06F 12/1408* (2013.01); *G06F 12/1475* (2013.01); *G06F 12/1491* (2013.01); *G06F 21/60* (2013.01); *G06F 21/79* (2013.01); *G06F 2212/1052* (2013.01)

(58) Field of Classification Search
  CPC .. G06F 12/1408; G06F 12/1491; G06F 21/60; G06F 2212/1052
  See application file for complete search history.

(56) References Cited

U.S. PATENT DOCUMENTS

| | | | | |
|---|---|---|---|---|
| 2010/0223438 | A1* | 9/2010 | Vermeulen | G06F 12/1441 711/163 |
| 2012/0042144 | A1* | 2/2012 | Grisenthwaite | G06F 12/145 711/E12.091 |
| 2014/0108719 | A1* | 4/2014 | Ito | G11C 7/1036 711/110 |
| 2015/0067279 | A1 | 3/2015 | Costin | |
| 2015/0248357 | A1 | 9/2015 | Kaplan et al. | |
| 2016/0085695 | A1* | 3/2016 | Leslie-Hurd | G06F 12/1441 711/163 |
| 2016/0188337 | A1* | 6/2016 | Lee | G06F 12/0811 712/207 |
| 2017/0090922 | A1* | 3/2017 | Tu | G06F 9/3016 |

FOREIGN PATENT DOCUMENTS

| | | |
|---|---|---|
| CN | 101533440 | 9/2009 |
| EP | 2 211 285 | 7/2010 |
| EP | 2 521 064 | 11/2012 |
| GB | 2 402 763 | 12/2004 |
| JP | 62-256040 | 11/1987 |
| JP | 2006-527420 | 11/2006 |
| WO | 2004/111834 | 12/2004 |

OTHER PUBLICATIONS

Combined Search and Examination Report for GB 1518541.6 dated Apr. 8, 2016, 7 pages.
Office Action for EP Application No. 16762860.1 dated May 3, 2019, 4 pages.
Office Action for TW Application No. 105131539 dated Jun. 8, 2020 and English translation, 16 pages.
First Office Action for CN Application No. 201680059729.3 dated Nov. 19, 2021 and English translation, 22 pages.
Office Action for IN Application No. 201817018320 dated Mar. 27, 2021, 8 pages.
Office Action for JP Application No. 2018-519050 dated Nov. 5, 2020 and English translation, 6 pages.

* cited by examiner

MEMORY ACCESS INSTRUCTIONS

This application is the U.S. national phase of International Application No. PCT/GB2016/052736 filed Sep. 6, 2016 which designated the U.S. and claims priority to GB Patent Application No. 1518541.6 filed Oct. 20, 2015, the entire contents of each of which are hereby incorporated by reference.

This disclosure relates to the field of data processing systems. More particularly, this disclosure relates to memory access instructions within data processing systems and access conditions associated with those memory access instructions.

It is known to provide data processing systems with memory access instructions which when decoded served to perform a memory access operations, such as data loads or data stores, between a memory and a processor core. In order to manage memory access conditions within such systems it is known to provide hardware such as memory management units or memory protection units, which are programmed with permission data used to control memory accesses, e.g. particular memory addresses or ranges of memory addresses may be marked as read only, read/write, privileged access only, etc.

At least some embodiments of the disclosure provide apparatus for processing data, comprising:
processing circuitry to perform processing operations specified by program instructions; and
a decoder to decode memory access instructions to generate control signals to control said processing circuitry to perform memory access operations; wherein
said memory access instructions have respective encodings specifying:
protected memory access instructions corresponding to protected memory access operations; and
less-protected memory access instructions corresponding to less-protected memory access operations; and
said less-protected memory access operations are associated with less restrictive memory access conditions than said protected memory access operations.

At least some embodiments of the disclosure provide apparatus for processing data comprising:
processing means for performing processing operations specified by program instructions; and
decoder means for decoding memory access instructions to generate control signals to control said processing means to perform memory access operations; wherein
said memory access instructions have respective encodings specifying:
protected memory access instructions corresponding to protected memory access operations; and
less-protected memory access instructions corresponding to less-protected memory access operations; and
said less-protected memory access operations are associated with less restrictive memory access conditions than said protected memory access operations.

At least some embodiments of the disclosure provide a method of processing data, comprising:
decoding memory access instructions to generate control signals to control processing circuitry to perform memory access operations; wherein
said memory access instructions have respective encodings specifying:
protected memory access instructions corresponding to protected memory access operations; and
less-protected memory access instructions corresponding to less-protected memory access operations; and
said less-protected memory access operations are associated with less restrictive memory access conditions than said protected memory access operations.

Example embodiments will now be described, by way of example only, with reference to the accompanying drawings in which.

Figure 1:
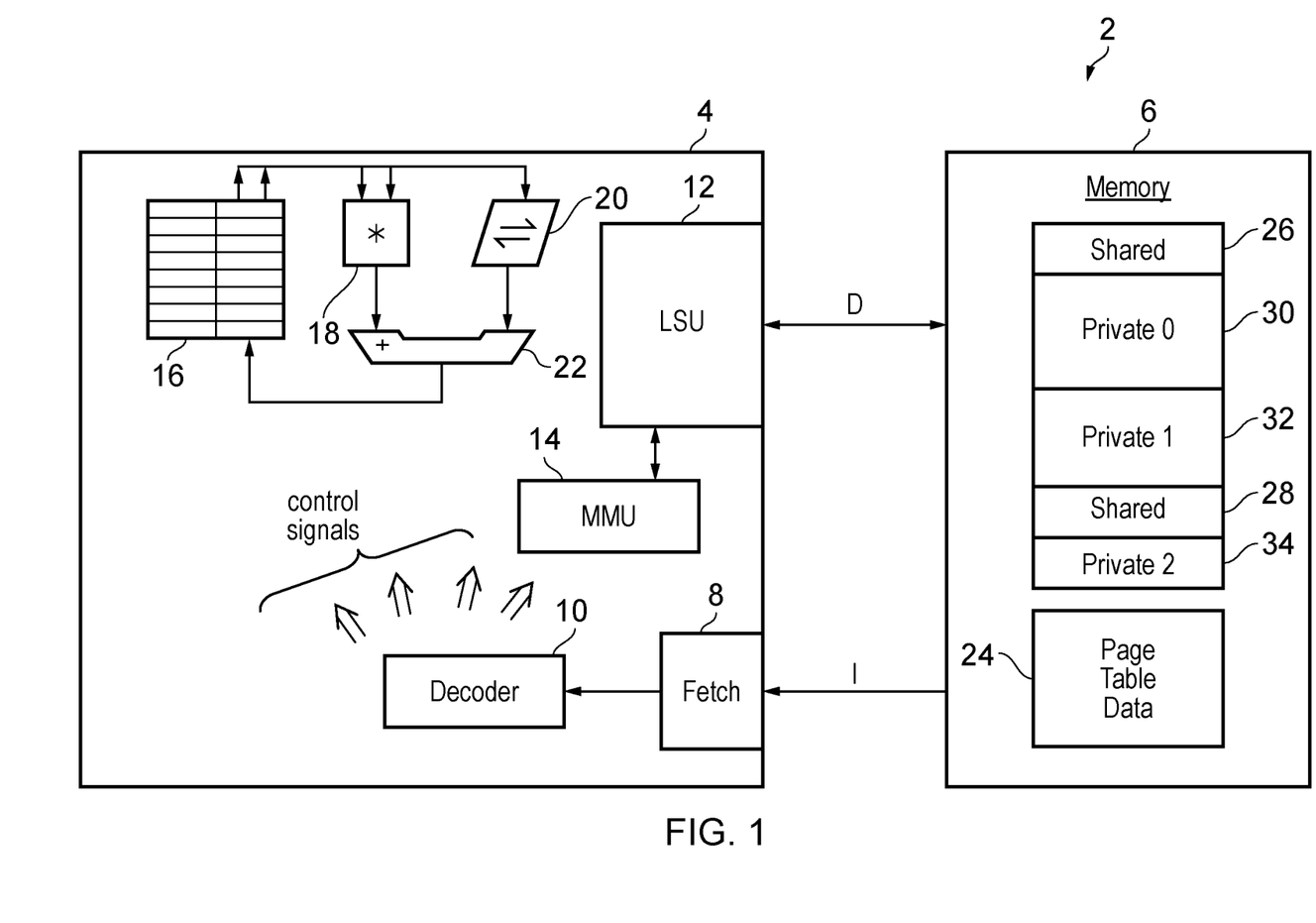
FIG. 1 schematically illustrates a data processing system.

FIG. 1 schematically illustrates a data processing system 2 including a processor core 4 and a memory 6. The processor core 4 includes an instruction fetch unit 8, a decoder 10, a load store unit 12, a memory management unit 14, a register bank 16, and arithmetic processing circuitry including a multiplier 18, a shifter 20 and an adder 22. In operation, the instruction fetch unit 8 fetches program instructions from the memory 6 and passes these to the decoder 10. The decoder 10 decodes the program instructions and generates control signals which are then used to control processing operations to be performed by other elements of the processing circuitry, such as the load store unit 12 and the arithmetic processing circuits 18, 20, 22.

Memory access operations, such as those resulting from load instructions and store instructions between a register within the register bank 16 and a memory address within the memory 6, are performed by the load store unit 12. The control signals generated by the decoder 10 control the load store unit 12 to perform the memory access operation specified by the decoded memory access instructions. The memory management unit 14 uses page table data 24 stored within the memory 6 to enforce access conditions associated with the memory addresses (or regions of memory addresses, such as memory pages) within the memory 6. These memory access conditions may include that particular memory addresses are accessible to reads, but not accessible to writes, are cacheable, are accessible to only certain privilege levels (only certain exception levels), or other attributes.

The memory 6 may store data in a plurality of regions as shown in the present example. These regions may include shared regions 26, 28 and private regions 30, 32, 34. The shared regions 26, 28 may be shared between programs and thus facilitate the sharing/exchange of data between programs. The private regions 30, 32, 34 are private to specific programs. This privacy may be enforced against programs which have a higher privilege level than the program which has private access to the private regions 30, 32, 34. Thus, an application program may have a private memory region 30, 32, 34 which is accessible to that application program, but is not accessible to a program operating at a higher level of privilege (exception level), such as an overlying operating system or hypervisor program which is providing an execution environment to programs at a lower level of privilege (exception level).

The example illustrated in FIG. 1 utilises a memory management unit 14 and page table data 24. It will be appreciated by those in this technical field that other embodiments may utilise different memory access control circuitry, such as a memory protection unit applying access conditions associated with memory protection regions within the memory address space.

A potential security vulnerability associated with the use of memory management units 14 (and memory protections units) is that erroneous or malicious changes to the page table data 24 (or data defining the memory regions and protecting of a memory protection unit) may result in memory regions 30, 32, 34 which should be treated as private instead being treated as shared and access being inappropriately given to other application programs. Such private regions, 30, 32, 34 may contain sensitive data, such as cryptographic keys, financial data, or the like.

Figure 2:
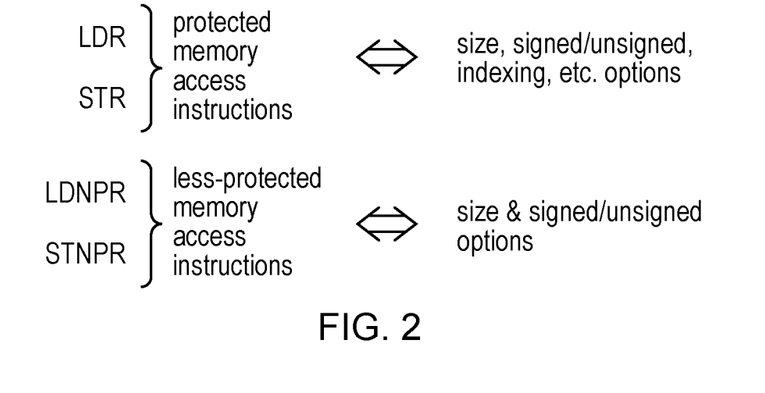
FIG. 2 schematically illustrates protected memory access instructions and less-protected memory access instructions.

The memory access instructions provided in accordance with the present example take the form of protected memory access instructions, such a protected load instructions, LDR, or a protected store instructions STR. The memory access instructions further comprise less-protected memory access instructions, such as a less-protected load instruction LDNPR or a less-protected store instruction STNPR. These are discrete types of instructions with there own instruction encodings. Not all the variants of one type of encoding need be provided for the other type of encoding. In this example embodiment, the protected memory access instructions have more variants in their encoding than the less-protected memory access instructions, e.g. the protected memory access instructions have options allowing the specifying of data value size, signed/unsigned data, indexing to be applied to memory addresses and other options. By comparison, the less-protected memory access instructions have fewer options, such as data size and signed/unsigned data.

The provision of different types of memory access instructions allows a programmer (or complier) to use the protected memory access instructions by default and then select use of the less-protected memory access instructions for those particular memory access operations which the programmer knows may be safely subject to less restricted memory access conditions. For example, the protected memory access instructions may be used by default for all memory accesses other than those known by the programmer to be intended to be made to shared regions 26, 28 within the memory 6. These memory accesses to shared regions may use the less-protected memory access instructions. The programmer at the time of writing the program code will know that certain data is to be shared with other application programs and written into the shared regions 26, 28 and accordingly it is appropriate for such a memory access to be performed using the less-protected memory access instructions. In this way, even if the data controlling the memory management unit 14, (or a memory protection unit) is incorrect, the use of a protected memory instruction with more restricted memory access conditions may serve to prevent a program from inadvertently storing data to a shared region 26, 28 or in advertently loading data (which may have been altered) from a shared region 26, 28.

Figure 3:
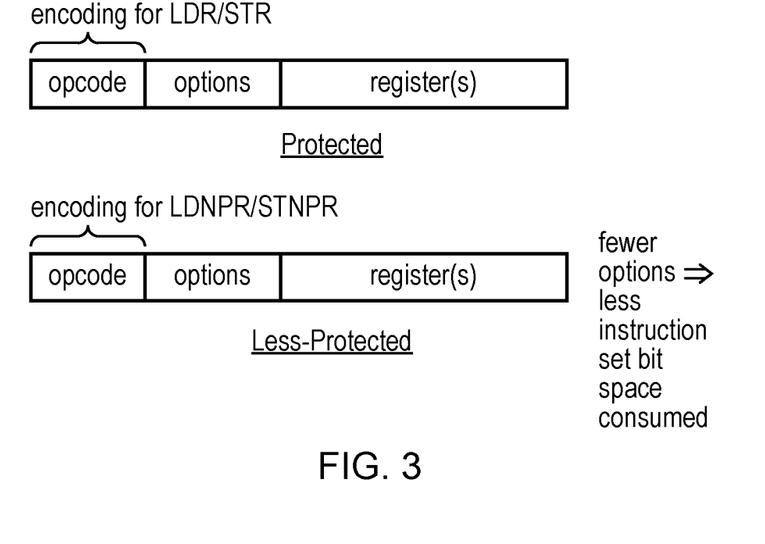
FIG. 3 schematically illustrates instruction encodings for the memory access instructions of FIG. 2.

FIG. 3 schematically illustrates example encodings for both the protected memory access instructions LDR/STR and the less-protected memory access instructions LDNPR/STNPR. These instructions have different encodings (opcodes) so that they be recognised as different types of instructions by the decoder 10 which will accordingly generate different control signals in order to control the load store unit 12 to behave differently in respect of the these different types of instructions as will be discussed further below. The protected memory access instructions LDR/STR have more associated options, such as size, signed/unsigned, indexing, associated with them than do the less-protected memory instructions LDNPR/STNPR as shown. The program instructions further specify parameters such as the registers within the register bank 16 to which memory access instructions relate and which may, for example, contain a target memory address within the memory 6. The provision of fewer options for the less-protected memory access instructions has the result that these consume less instruction set bit space. This is a finite resource within a process or architecture and may be valuably used elsewhere. In practice, memory access operations in respect of data known by the programmer to require sharing tend to be relatively infrequent and accordingly the provision of fewer options, for such less-protected memory accesses instructions does not result in an excessive increase in code size and is more than outweighed than the saving in instruction set bit space.

Figure 4:
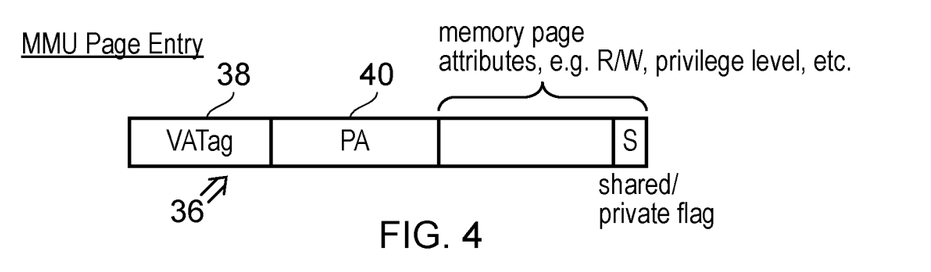
FIG. 4 schematically illustrates a memory management unit page entry including a shared/private flag.

FIG. 4 schematically illustrates a memory management unit page table entry 36. Such page table entries can have a wide variety of different forms. Typically such memory management unit page table entries 36 support address translation between virtual addresses and physical addresses using a virtual address TAG 38 and corresponding physical address translation data 40. Also associated with each page (region) within the memory address space associated with a page entry are memory page attributes defining characteristics such as readability, writeability, privileged level access restrictions, cacheability etc. Also included within the memory page attribute data is a shared/private flag indicating whether memory addresses within that region are shared or private. Shared address are shared within multiple programs where are private addresses are only accessible to one program. Other forms of memory page attribute may include flags indicating whether a particular region is encrypted or not encrypted. Encrypted regions are encrypted using an encryption key and then decrypted by a suitably authorised program having possession of the appropriate decryption key.

In the case of the shared/private flag, memory regions marked as shared should only be accessed by the less-protected memory access instructions, similarly, memory regions marked as private should only be accessed by the protected memory access instructions. If the wrong type (encoding) of memory access instructions attempts a memory access to a given region of memory, then this may be detected and give rise to a data abort (trigger memory access exception processing).

Figure 5:
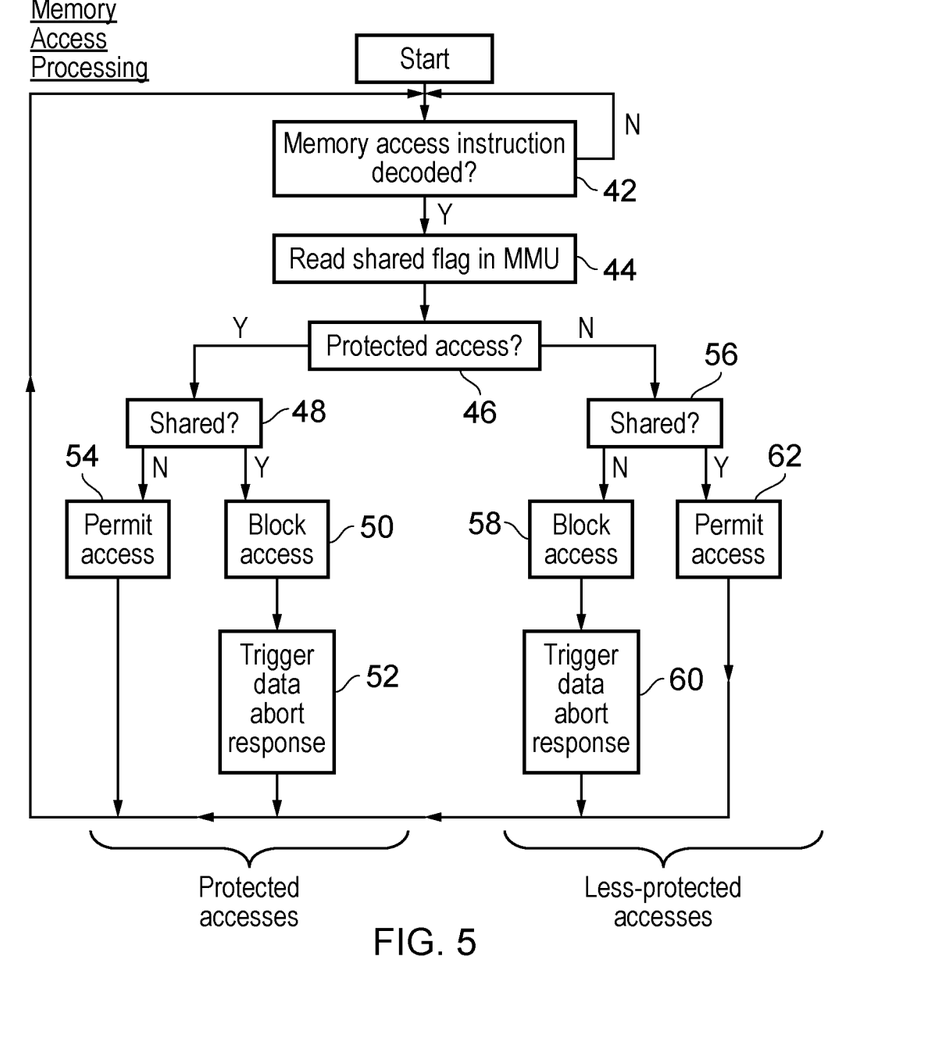
FIG. 5 is a flow diagram schematically illustrating memory access processing.

FIG. 5 is a flow diagram schematically illustrating one form of memory access processing. At step 42 processing often waits until a memory access instruction is decoded. When a memory access instruction is decoded, then the control signals are generated by the decoder 10 to control the load store unit 12 to perform the memory access operation specified in cooperation with the memory management unit 18. At step 44 the shared flag data (as well as other data) for the memory access instruction decoded at step 42 is read. Step 46 then determines whether the memory access instruction decoded at step 42 was a protected memory access instruction. If the instruction decoded at step 42 was a protected memory access instruction, then processing proceeds to step 48 where a determination is made as to whether or not the shared flag read at step 44 indicates that the memory region containing the memory address to be accessed is shared. If the determination at step 48 is that the memory region is shared then this indicates that the protected memory access instruction being used in appropriate and accordingly processing proceeds to step 50 where the access is blocked following which a data abort response is triggered at step 52 prior to returning the processing to step 42. If the determination at step 48 is that the memory access is not to a shared region, then the use of the protected memory access instruction is not appropriate (i.e. the memory region is private) and accordingly the access is permitted at step 54 and is performed. If the determination at step 46 is that the memory access instruction decoded at step 42 is a less-protected memory access instruction, then the processing proceeds to step 56 where a determination is made as to whether or not the shared flag read at step 44 indicates that the memory address associated with the less-protected memory access instruction is shared. If the memory region is not shared, then this indicates that use of the less-protected memory access instruction is inappropriate and processing proceeds to step 58 where the memory access is blocked and step 60 where a data abort response is triggered. If the determination at step 56 is that the memory region is shared, then the use of the less-protected memory access instruction decoded at step 42 is appropriate and accordingly processing proceeds to step 62 where the access is permitted.

Figure 6:
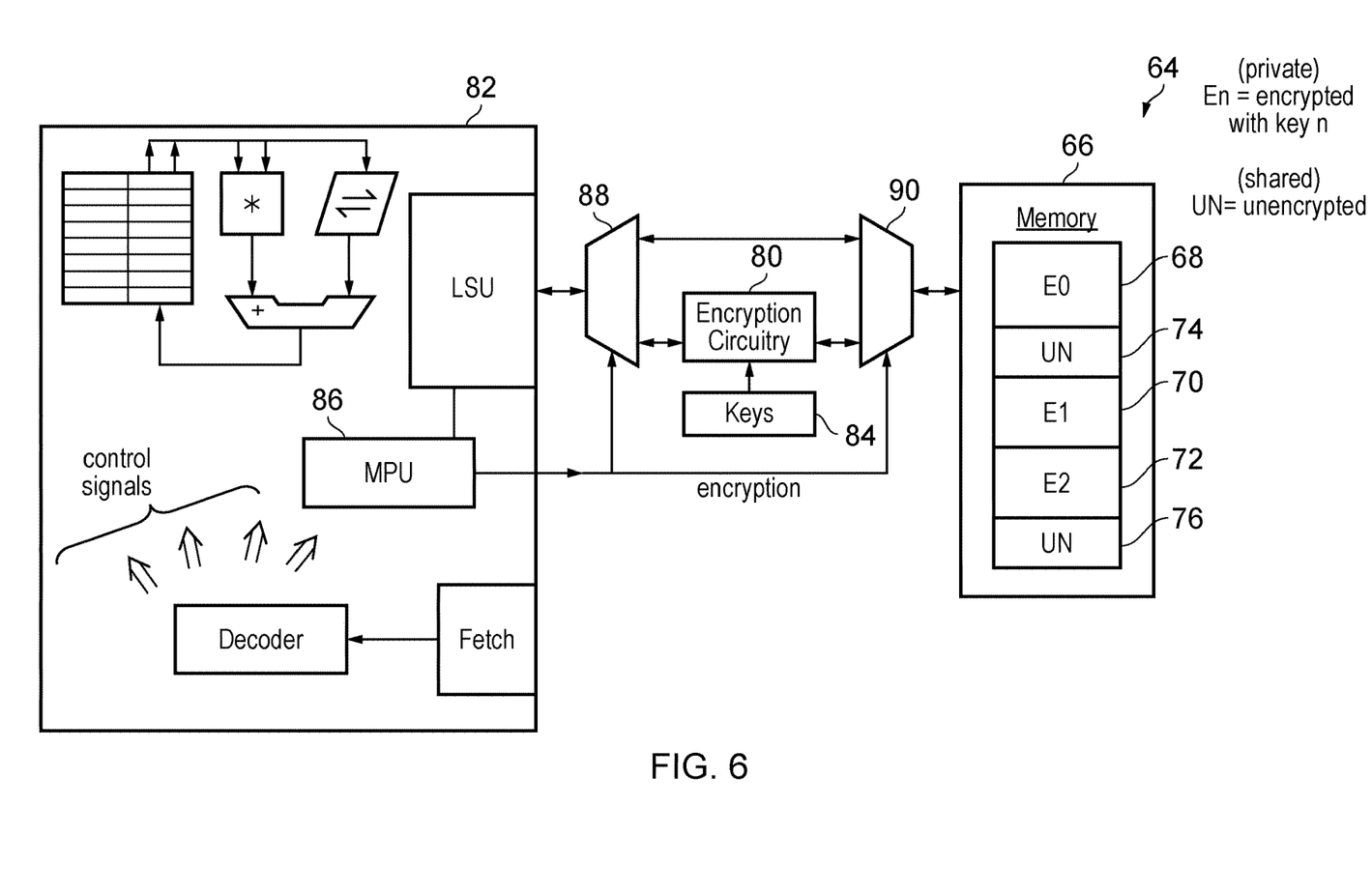
FIG. 6 schematically illustrates a further example embodiment incorporating encryption circuitry to encrypt data with regions of a memory.

FIG. 6 schematically illustrates a further example embodiment of a data processing system 64 utilising the present techniques. In this example embodiment, memory regions within a memory 66 may be encrypted regions 68, 70, 72 or unencrypted regions 74, 76. Encryption circuitry 80 disposed between a processor core 82 and the memory 66 serves to provide encrypted for data being written into the encrypted regions 68, 70, 72 and decryption for data being read from encryption regions 68, 70 72. The encryption and decryption uses cryptographic keys 84 that are private to the program of programs having access to the respective encrypted regions 68, 70, 72.

In this example embodiment, the memory access control circuitry takes the form of a memory protection unit 86 with different regions within the memory address space of the memory 66 being marked as either being subject to encryption or being unencrypted. When a memory region is encrypted, then multiplexers 88, 90 are used switched to route the data via the encryption circuitry 80. When the memory address being accessed is within a region which is unencrypted, then the encryption circuitry 80 is bypassed by the multiplexers 88, 90. The encryption circuitry 80 may be used and active for protected memory access instructions and be bypassed for less-protected memory access instructions. The unencrypted regions 74, 76 may be shared between programs, whereas the encrypted regions 68, 70, 72 may be private to an individual program or a number of programs sharing a cryptographic key. If a less-protected memory access instruction is used in respect of a memory access marked as encrypted by the memory protection unit 86, then a data abort may be triggered. Similarly, if a protected memory access instruction is used for a memory address within a region that this unencrypted, then a data abort may also be triggered.

Figure 7:
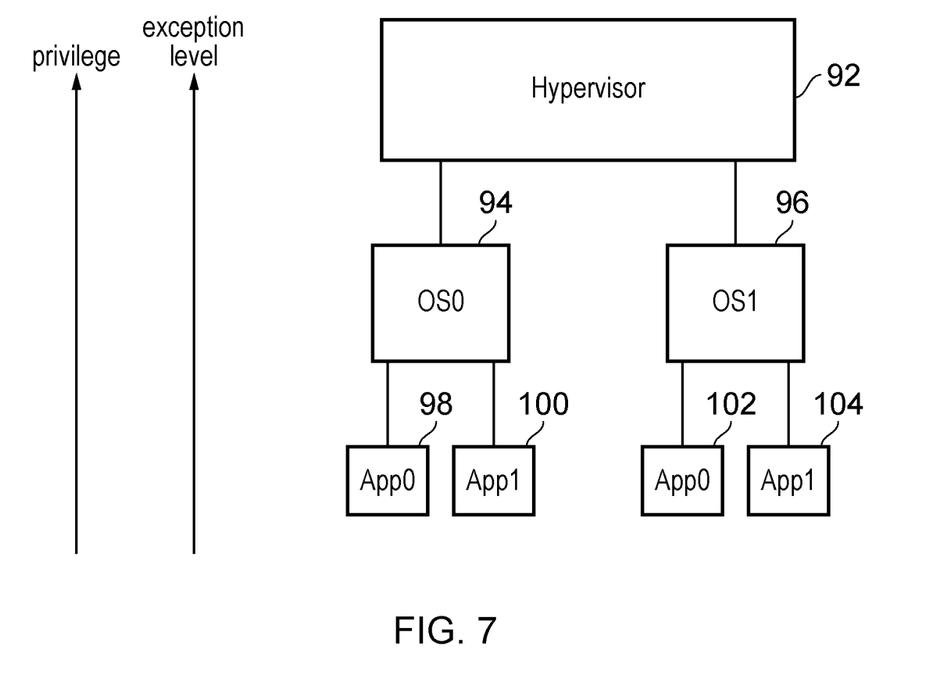
FIG. 7 schematically illustrates a hierarchy of privileged and less-privileged programs executing at different exception levels.

FIG. 7 schematically illustrates a hierarchy of programs operating at different privilege/exception levels. The programs may include at a highest privilege level a hypervisor program 92 providing an execution environment to a guest operating system programs 94, 96 operating at a lower level of privilege (lower exception level). Each of the operating system programs, 94, 96 may respectively provide an execution environment for application programs 98, 100, or application programs 102, 104. The operating system programs 94, 96 operate at a higher level of privilege (exception level) than the application programs 98, 100, 102, 104.

Previously described example embodiments have controlled access using shared/private flags or encrypted/unencrypted flags in association with the protected memory access instructions and the less-protected memory access instructions and the less-protected memory access instructions. Further embodiments may serve to impose memory access conditions associated with the privilege level (exception level) at which a program is executed. A programmer may decide that it is appropriate to share data with one or more other programs operating at a different level (privilege level). As an example, an application program 98, 100, 102, 104 may be controlled such that is can share data with an overlying operating system program 94, 96, but not with other application programs or with the hypervisor program 92. Less-protected memory access instructions may be associated with such data which it is desired to share with other exception levels, whereas data which it is not desired to share with other exception levels may be accessed using protected memory access instructions.

Figure 8:
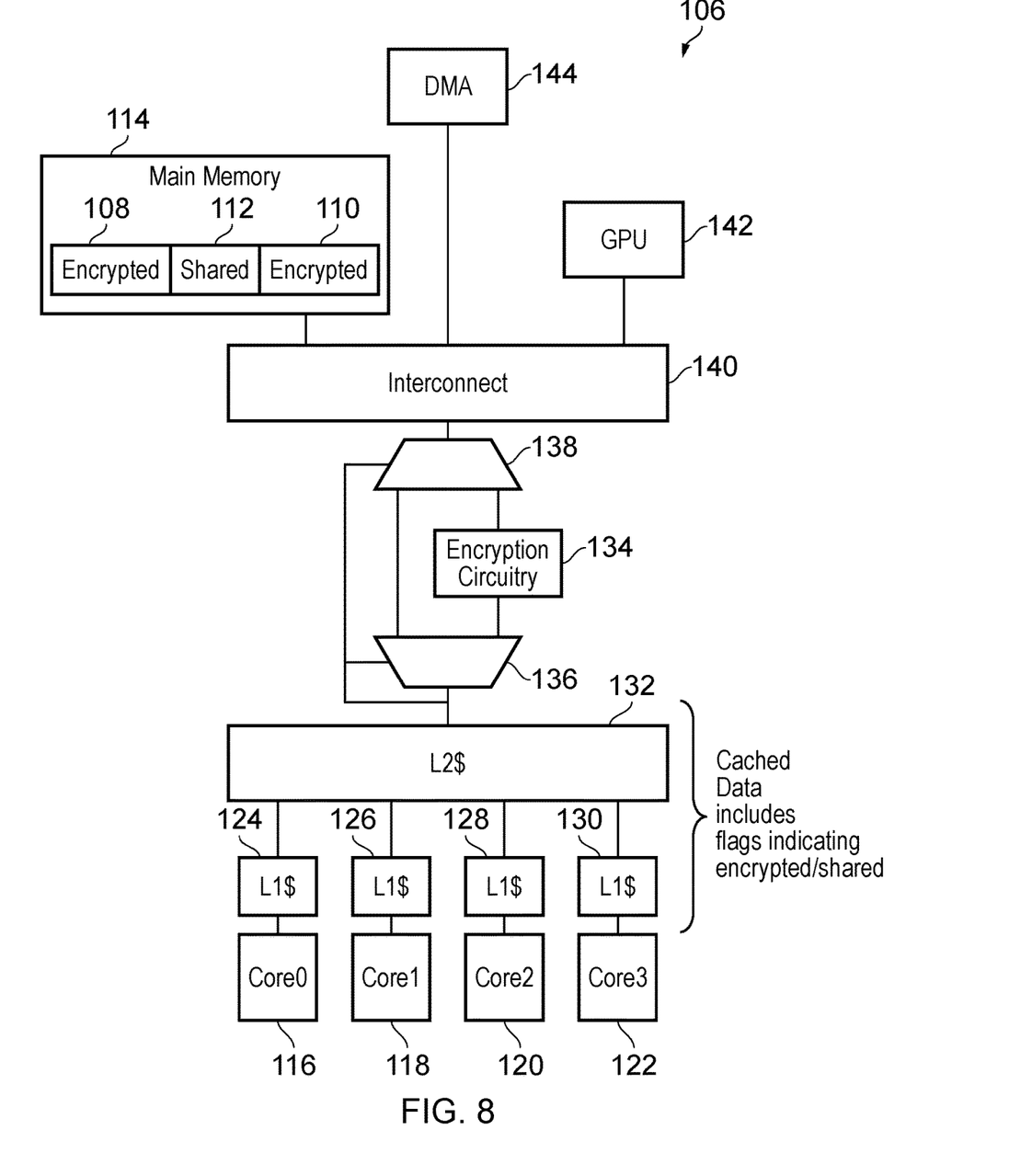
FIG. 8 schematically illustrates a further example embodiment of a data processing system including multiple layers within the memory system hierarchy and encryption circuitry.

FIG. 8 schematically illustrates a further example embodiment of a data processing system 106 utilising the present techniques. This data processing system 106 utilises encrypted memory regions 108, 110, and a shared memory region 112 within a main memory 114. Compared to the embodiment of FIG. 6, the embodiment of FIG. 8 utilises a memory system employing various levels of hierarchy. Four processor cores 116, 118, 120, 122 each have a local private cache memory 124, 126, 128 and 130. Above these local caches 124, 126, 128 and 130 in the a memory hierarchy is a shared cache memory 132. The data within each of the cache memories 124, 126, 128, 130, 132 is stored in unencrypted form irrespective of whether or not it is marked as being encrypted/shared. If the data is to be encrypted/shared, then it is flagged within the cache memories 124, 126, 128, 130, 132 and appropriately routed through encryption circuitry 134 or around the encryption circuitry (bypassed) using multiplexers 136, 138 under control of such flags. Thus, data closer to the processor cores 116, 118, 120, 122 than the encryption circuitry 134 is stored in unencrypted form and accordingly does not incur the energy/time penalty associated with encryption/decryption) whereas data further out within memory hierarchy than the encryption circuitry 134, namely passing via an interconnect 140 and being stored within the main memory 114 is encrypted. A graphics processing unit 142 and a direct memory access unit 144 are also connected via the interconnect 140.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:
1. Apparatus for processing data, comprising:
processing circuitry to perform processing operations specified by program instructions; and
a decoder to decode memory access instructions to generate control signals to control said processing circuitry to perform memory access operations; wherein said memory access instructions have respective encodings specifying:
  protected memory access instructions corresponding to protected memory access operations and having a first op code encoding; and
  less-protected memory access instructions corresponding to less-protected memory access operations and having a second op code encoding different from the first op code encoding; and
said less-protected memory access operations are associated with less restrictive memory access conditions than said protected memory access operations; and
said processing circuitry has a plurality of exception level states, and a memory address accessed with one of the less-protected memory access instructions within a program executing at a given exception level state within said plurality of exception level states is shared with programs executing in a selectable number of further exception level states within said plurality of exception level states and another memory address accessed with one of the protected memory access instructions within another program executing at another exception level state within said plurality of exception level states is private to said another program;
encryption circuitry to encrypt data stored in a memory and to decrypt data read from said memory, wherein said encryption circuitry is active for said protected memory access operations and said encryption circuitry is inactive for said less-protected memory access operations.

2. Apparatus as claimed in claim 1, wherein said less-protected memory access instructions have an encoding permitting a different number of variants than said protected memory access instructions.

3. Apparatus as claimed in claim 2, wherein said less-protected memory access instructions have an encoding permitting fewer variants than said protected memory access instructions.

4. Apparatus as claimed in claim 1, comprising memory access control circuitry to control access to regions of memory address space in dependence upon memory protection data, said memory protection data including at least one attribute applied by said memory access control circuitry to enforce less restrictive memory access conditions upon said less-protected memory access instructions than upon said protected memory access instructions.

5. Apparatus as claimed in claim 4, wherein
said at least one attribute indicates when a memory address is a shared memory address;
said memory access control circuitry blocks memory accesses to said shared memory address by said protected memory access instructions; and
said memory access control circuitry permits memory accesses to said shared memory address by said less-protected memory access instructions.

6. Apparatus as claimed in claim 5, wherein
said at least one attribute indicates when a memory address is a private memory address;
said memory access control circuitry permits memory accesses to said private memory address by said protected memory access instructions; and
said memory access control circuitry blocks memory accesses to said private memory address by said less-protected memory access instructions.

7. Apparatus as claimed in claim 5, wherein said memory access control circuitry is responsive to an attempted memory access to said shared memory address by a protected memory access instruction to trigger a data abort response.

8. Apparatus as claimed in claim 5, wherein said memory access control circuitry is responsive to an attempted memory access to other than a shared memory address by a less-protected memory access instruction to trigger a data abort response.

9. Apparatus as claimed in claim 4, wherein said memory access control circuitry is a memory management unit and said memory protection data is memory page table data.

10. Apparatus as claimed in claim 4, wherein said memory access control circuitry is a memory protection unit and said memory protection data is memory region configuration data for said memory protection unit.

11. Apparatus as claimed in claim 1, comprising encryption circuitry to encrypt data stored in a memory by said protected memory access operations and to decrypt data read from said memory by said protected memory access operations.

12. Apparatus as claimed in claim 1, wherein said processing operations comprise:
executing a plurality of programs;
executing protected memory access instructions within a given program of said plurality of programs to access memory addresses private to said given program; and
executing less-protected memory access instructions within said given program of said plurality of programs to access memory addresses shared between said plurality of programs.

13. Apparatus as claimed in claim 12, wherein said plurality of programs include a privileged program and at least one further program executing using an execution environment provided by said privileged program, said at least one further program using protected memory access instructions to access memory address private from said privileged program.

14. Apparatus as claimed in claim 13, wherein said privileged program is a hypervisor program and said at least one further program is an operating system program.

15. Apparatus as claimed in claim 13, wherein said privileged program is an operating system program and said at least one further program is an application program.

16. A computer program stored on a non-transitory storage medium to control a computer to provide a virtual machine execution environment corresponding to an apparatus as claimed in claim 1.

17. Apparatus for processing data, comprising:
means for performing processing operations specified by program instructions; and
means for decoding memory access instructions to generate control signals to control said means for performing processing operations to perform memory access operations; wherein
said memory access instructions have respective encodings specifying:
  protected memory access instructions corresponding to protected memory access operations and having a first op code encoding; and
  less-protected memory access instructions corresponding to less-protected memory access operations and having a second op code encoding different from the first op code encoding; and
said less-protected memory access operations are associated with less restrictive memory access conditions than said protected memory access operations; and said means for performing processing operations has a plurality of exception level states, and a memory address accessed with one of the less-protected memory access instructions within a program executing at a given exception level state within said plurality of exception level states is shared with programs executing in a selectable number of further exception level states within said plurality of exception level states and another memory address accessed with one of the protected memory access instructions within another program executing at another exception level state within said plurality of exception level states is private to said another program;

means for encrypting data stored in a memory and to decrypt data read from said memory, wherein said means for encrypting data is active for said protected memory access operations and said means for encrypting data is inactive for said less-protected memory access operations.

18. A method of processing data, comprising:

decoding memory access instructions to generate control signals to control processing circuitry to perform memory access operations; wherein said memory access instructions have respective encodings specifying:

protected memory access instructions corresponding to protected memory access operations and having a first op code encoding; and less-protected memory access instructions corresponding to less-protected memory access operations and having a second op code encoding different from the first op code encoding; and said less-protected memory access operations are associated with less restrictive memory access conditions than said protected memory access operations; and said processing circuitry has a plurality of exception level states, and a memory address accessed with one of the less-protected memory access instructions within a program executing at a given exception level state within said plurality of exception level states is shared with programs executing in a selectable number of further exception level states within said plurality of exception level states and another memory address accessed with one of the protected memory access instructions within another program executing at another exception level state within said plurality of exception level states is private to said another program;

encryption circuitry to encrypt data stored in a memory and to decrypt data read from said memory, wherein said encryption circuitry is active for said protected memory access operations and said encryption circuitry is inactive for said less-protected memory access operations.

\* \* \* \* \*